3,014,892
POLYEPOXY ETHERS OF EPOXY-SUBSTITUTED POLYHYDRIC PHENOLS AND CURED PRODUCTS OBTAINED THEREFROM
Carl G. Schwarzer, Walnut Creek, and Paul H. Williams, Orinda, Calif., assignors to Shell Oil Company, a corporation of Delaware
No Drawing. Filed July 21, 1958, Ser. No. 749,608
12 Claims. (Cl. 260—47)

This invention relates to a new class of epoxy ethers and to their preparation. More particularly, the invention relates to new epoxy ethers of special polyhydric phenols prepared from epoxy-substituted carbonylic compounds and to the utilization of these epoxy ethers, particularly in the preparation of surface coatings, adhesive, and laminates.

Specifically, the invention provides new and particularly useful polyepoxy ethers comprising polyethers of epoxy-substituted monohydric alcohols, and preferably alcohols as glycidol, and epoxy-substituted polyhydric polynuclear phenols obtained by condensing a phenol with an epoxy-substituted carbonylic compound. The invention further provides new and particularly useful insoluble, infusible products obtained by curing the above-described polyepoxy ethers alone or in admixture with other polyepoxides, such as glycidyl ethers of 2,2-bis(4-hydroxyphenyl)propane, in the presence of epoxy curing agents.

Epoxy resins known heretofore have been largely polyglycidyl ethers of a dihydric phenol, such as bisphenol-A, i.e., 2,2-bis(4-hydroxyphenyl)propane. Although the cured products of these epoxy resins are hard and strong at normal atmospheric temperatures, the hardness and strength of the products are much less at elevated temperatures. Consequently, the usual epoxy resins are not very suitable in applications where the cured product is subjected to conditions of elevated temperatures. In addition, the water resistance of the cured products is not as good as desired for many applications.

It is, therefore, an object of the invention to provide a new class of epoxy ethers. It is a further object to provide new epoxy ethers that can be cured to form insoluble infusible products having improved resistance to heat. It is a further object to provide new epoxy ethers that can be cured to form products having improved resistance to water. It is a further object to provide new epoxy ethers which are particularly useful for making surface coatings, adhesives and laminates. It is a further object to provide new epoxy ethers that can be cured to form products having good resistance to solvents. These and other objects of the invention will be apparent from the following detailed description thereof.

It has now been discovered that these and other objects may be accomplished by the new polyether polyepoxides of the invention which comprise polyethers of epoxy-substituted monohydric alcohols, such as, for example, glycidol, and epoxy-substituted polyhydric polynuclear phenols obtained by condensing a phenol with an epoxy-substituted carbonylic compound or the corresponding chlorohydrin substituted carbonylic compound in the presence of alkaline material. It has been found that these polyepoxy polyethers possess, particularly because of the presence of the epoxyalkyl group located in a central position in relation to the phenolic groups, many unexpected and superior properties as compared to conventional polyether polyepoxides. It has been found, for example, that these special epoxy ethers can be converted with conventional epoxy curing agents to form products having excellent hardness at elevated temperatures. It has also been found that the new epoxy ethers give cured products having improved resistance to water and solvents. These valuable properties make the new class of ethers particularly useful in applications, such as high temperature adhesives, laminates, molded articles, and in the preparation of improved surface coatings.

The new polyepoxy ethers of the invention are derived from polyhydric polynuclear phenols which are readily obtained by condensing a phenol with an epoxy-substituted carbonylic compound or a substituted carbonylic compound, such as a chlorohydrin-substituted carbonylic compound that can be converted to the epoxy-substituted derivative. This condensation is effected by mixing the phenol and the carbonylic compound together using a substantial excess of the phenol over the stoichiometric proportions of phenol required for reaction with the carbonylic compound through the carbonylic groups, introducing hydrogen chloride, allowing the mixture to react for several days and removing the unreacted phenol, such as by distillation.

The polyhydric phenol prepared from phenol and glycidaldehyde may be illustrated by the following:

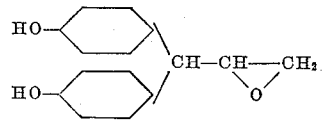

The phenols used in the condensation reaction may be monohydric or polyhydric and may be substituted with other substituents as halogen atoms, alkoxy radicals, hydrocarbyl radicals and the like. Examples of the monohydric phenols that may be used in the above process include, among others, phenol, 3-chlorophenol, 3,5 - dichlorophenol, 3 - ethylphenol, 3,5 - diisopropylphenol, 3-methoxyphenol, 3-chloro-5-methoxyphenol, ortho and meta-cresol, and the like. Particularly preferred are the monohydric phenols containing from 6 to 12 carbon atoms and containing elements of the group consisting of carbon, hydrogen, oxygen and chlorine.

Examples of polyhydric phenols that may be used in the preparation of the above-described polyhydric phenols include, among others, resorcinol, 2,2-bis(4-hydroxyphenyl)propane, 2,2-bis(4-hydroxyphenyl)butane, 1,4-dihydroxy-3-butylbenzene, 1,4-dihydroxy-3-tertiary-butylbenzene, catechol, hydroquinone, methyl resorcinol, 1,5-dihydroxynaphthalene, 4,4'-dihydroxybenzophenone, bis(4 - hydroxyphenyl)ethane and the like, and their chlorinated derivatives. Preferred polyhydric phenols to be employed are the di- and trihydric phenols substituted on single aromatic ring or rings that are joined together through an alkylene group, and containing no more than 25 carbon atoms, and preferably no more than 15 carbon atoms.

The epoxy-substituted carbonylic compound used in the condensation reaction to form the new polyhydric phenols are those aliphatic or cycloaliphatic compounds having at least one 1,2-epoxy group, i.e.

group, and at least one carbonylic group, i.e., a

group, wherein R is hydrogen or a hydrocarbon radical, and preferably an alkyl or cycloalkyl radical containing up to 10 carbon atoms. Examples of these compounds include, among others, glycidaldehyde, 2,3-epoxybutyraldehyde, 1,2-epoxy-3-ketobutane, 2,3-epoxy-4-ketobutane and the like. Particularly preferred are the monoepoxy and diepoxy-substituted aliphatic monoaldehydes and monoketones containing no more than 12 carbon atoms, and particularly those wherein the epoxy group and carbonyl group are in close proximity to one another and preferably in adjacent positions.

The derivatives of the above-noted epoxy-substituted carbonylic compounds that may be used in their place in preparing the new polyhydric phenols are those that on further treatment give the epoxy-substituted compounds, such as their chlorohydrin derivatives. In this case, the epoxy group in the above compounds is replaced by the

group which can be converted to the epoxy group by treatment with alkaline materials.

The preparation of the polyhydric phenol by the reaction of phenol with glycidaldehyde is illustrated below:

*1,2-epoxy-3,3-bis(hydroxyphenyl)propane.*—3.06 moles of glycidaldehyde as a 61.2% aqueous solution and 3.6 moles of phenol were introduced into a stirred glass kettle and warmed until a homogeneous solution was obtained. The contents were cooled to 30° C. Hydrogen chloride gas was introduced into the solution and the solution allowed to stand several days. The solution was then heated between 40 and 60° C. for several hours. Excess phenol was then removed by distillation at 130° C. at 8 mm. The resulting bisphenol was a soft light colored solid soluble in hot water.

The preparation of one of the new polyhydric phenols using a chlorohydrin derivative of the epoxy-substituted carbonylic compound is illustrated by the following preparation of chloro-hydroxy-3,3-bis(hydroxyphenyl)propane from 1-hydroxy-2-chloropropanal:

*Chloro-hydroxy-3,3-bis(hydroxyphenyl)propane.*—3.06 moles of 1-hydroxy-2-chloropropanal as an aqueous solution and 3.6 moles of phenol were introduced into a stirred glass kettle and warmed until a homogeneous solution was obtained. Contents were cooled to 30° C. Hydrogen chloride gas was introduced into the solution and the solution allowed to stand several days. The solution was then heated to 60–70° C. for several hours. Excess phenol was then removed by distillation at 123° C. at 5 mm. The resulting product, identified as chloro-hydroxy-3,3-bis(hydroxyphenyl)propane, was received in 96% yield and had the following analysis: OH value 1.04 eq./100 g., Cl 10.6% phenolic acidity .861 eq./100 g., C 66.3%, H 5.5%.

The epoxy-substituted alcohols, the novel ethers of which are provided by the present invention, comprise those monohydric alcohols possessing at least one epoxy group, i.e., a

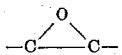

group. Examples of these alcohols include, among others, 2,3-epoxypropanol (glycidol), 3,4-epoxybutanol, 2,3-epoxybutanol, 2,3-epoxyhexanol, epoxidized octadecadienol, epoxidized dodecadienol, epoxidized tetradecadienol, 3,4-epoxydihydropyran-3-methanol, 2,3-dimethyl-4,5-epoxyoctanol, 2-methoxy-4,5-epoxyoctanol, 3,4-epoxy-5-chlorocyclohexanol, 2,3-epoxypropoxypropanol, 2,3-epoxypropoxyhexanol, 2,3-epoxypropoxy-2,3-dihydroxyheptanol, 2,3-epoxydodecanol and 4-chloro-5,6-epoxydodecanol.

Preferred epoxy-substituted alcohols are the epoxy-substituted aliphatic and cycloaliphatic monohydric alcohols containing from 3 to 18 carbon atoms, such as 2,3-epoxypropanol, 3,4-epoxybutanol, 3,4-epoxydodecanol, 2-methyl-2,3-epoxypropanol, 2,3-epoxycyclohexanol, 2,3-epoxypropoxyethanol, 2,3-epoxypropoxyoctanol, and the like.

Particularly preferred epoxy-substituted alcohols are the epoxyalkanols, epoxyalkoxyalkanol, epoxycycloalkanols and epoxyalkoxycycloalkanols, and particularly those containing not more than 12 carbon atoms, such as 2,3-epoxypropanol, 3,4-epoxyhexanol, 2,3-epoxypropoxyoctanol, 2,3-epoxy-5-octanol, 2,3-epoxy-6-dodecanol, 2,3-epoxypropoxy-5-octenol, 3,4-epoxycyclohexanol, 2,3-epoxypropoxy-4-cyclohexanol, and the like.

Of special interest are the monoepoxy-substituted alkanols containing from 3 to 8 carbon atoms and having the epoxy group in the terminal position. 2,3-alkanols, such as 2,3-epoxypropanol, are of particular interest, particularly because of the case of preparation of their ethers as well as the superior properties possessed by such ethers.

The ethers may be obtained by various methods. The epoxy ethers of the above-described polyhydric phenols are preferably obtained by reacting the phenol with an epoxy-halo-substituted alkane or a dihalo-hydroxy-substituted alkane in an alkaline medium.

The expression "halo-epoxy-substituted alkanes" as used herein refers to those alkanes having a 1,2-epoxy group, i.e., a

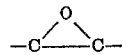

group attached directly to a halogen-bearing carbon atom, such as, for example, epichlorohydrin, epibromohydrin, 1,4-dichloro-2,3-epoxybutane, 1-chloro-2,3-epoxypentane, and the like. The expression "dihalo-hydroxy-substituted alkanes," as used herein, refers to those alkanes having a series of three carbon atoms, one of which is attached to a halogen atom, the next is attached to a hydroxyl group and the last is attached to a halogen atom, such as, for example, 1,3-dichloro-2-hydroxypropane, 2,4-dibromo-3-hydroxy-pentane, 2,3-dichloro-3-hydroxybutane, and the like. Epichlorohydrin comes under special consideration because of its low cost and because of the superior properties of the epoxides obtained therefrom.

The polyglycidyl ethers of the invention may be prepared by adding the polyphenol to epichlorohydrin using the latter in a ratio of about 2 to 10 molecules of epichlorohydrin per phenolic hydroxyl group of the phenol, and then adding an alkali metal hydroxide such as sodium or potassium hydroxide so as to effect the desired etherification reaction. It is convenient to dissolve the polyphenol in the substantial stoichiometric excess of epichlorohydrin and heat the mixture to about reflux temperature. Aqueous sodium hydroxide, such as about a 15% to 50% solution, is then added gradually with boiling of the reaction mixture. The water is then added gradually with boiling of the reaction mixture. The water added with the caustic and formed in the reaction is removed by distillation azeotropically with epichlorohydrin. Condensed distillate separates into an upper aqueous phase and a lower epichlorohydrin phase, which latter phase is returned as reflux. It is desirable to add the caustic and conduct the distillation at rates so that the reaction mixture contains at least about 0.5% water in order to have the etherification reactions progress at a reasonable rapid rate. The sodium hydroxide is added in an amount that is equivalent on stoichiometric basis to the quantity of starting phenol, or a small excess thereof such as 3% to 5%. Upon completion of the caustic addition and the etherification reactions, unreacted epichlorohydrin is separated by distillation. The residue consisting primarily of the polyglycidyl ether and salt is then combined with a mixture of equal volumes of toluene and butanone. This solvent mixture dissolves the ether, but not the salt which is removed by filtration. The filtrate is then distilled to separate the solvent and leave the polyglycidyl ether.

In the event the chlorohydrin derivative is employed to make the phenol, then additional caustic should be employed in the above reaction to effect dehydrochlorination of the phenol chlorohydrin group during the etherification reaction.

It is also possible, and in many cases desirable, to prepare the epoxy ethers by first forming an ether of the unsaturated alcohol corresponding to the epoxy alcohol and then epoxidizing the resulting produce by conventional methods as by treating with peracetic acid (e.g., 1 mole per unsaturated group to be epoxidized) preferably in a chloroform solvent. Thus, the 10,11-epoxyoctyl ether can be prepared by reacting the phenol with 10-octenylchloride in caustic and then reacting the resulting 10-octenyl ether with peracetic acid in chloroform.

The polyepoxy ethers of the present invention are liquids to soft wax like solids. They have more than one of the hydrogen atoms of the phenolic hydroxy groups of the phenol replaced by an epoxy-substituted radical and have an aliphatic epoxy group in the phenolic portion of the molecule, which group is not an epoxy ether group but attached to the phenol through carbon bonds.

As stated hereinabove, the new epoxy ethers can be cured to form hard, solvent and water resistant products which have very good heat resistance. The new epoxy ethers may be used in this capacity by themselves or with other polyepoxide materials in a variety of different proportions, such as, for example, with amounts of other polyepoxides varying from 5% to 98% by weight. Polyepoxides that may be copolymerized with these new polyepoxides include, among others, glycidyl polyethers of polyhydric phenols obtained by reacting polyhydric phenols, such as bis-phenol, resorcinol, and the like, with an excess of chlorohydrin such as epichlorohydrin, polyepoxide polyethers obtained by reacting an alkane polyol, such as glycerol and sorbitol, with epichlorohydrin and dehydrohalogenating the resulting product, polymers prepared from ethylenically unsaturated epoxides, such as allyl glycidyl ether, alone or with other ethylenically unsaturated monomers, and polyepoxide polyethers obtained by reacting a polyhydric alcohol or polyhydric phenol with any of the above-described polyepoxides. The glycidyl polyethers of polyhydric phenols obtained by condensing the polyethers of polyhydric phenols with epichlorohydrin as described above are also referred to as "ethoxyline" resins. See Chemical Week, vol. 69, page 27, for September 8, 1951.

A great variety of different curing agents may be employed in effecting the above-described homo- and copolymerization. Such agents include, among others, carboxylic acids or anhydrides, such as oxalic acid, phthalic anhydride; Friedel-Crafts metal halides, such as aluminum chloride, zinc chloride, ferric chloride, or boron trifluoride as well as complexes thereof with ethers, acid anhydrides, ketones, diazonium salts, etc.; phosphoric acid and partial esters thereof including n-butyl orthophosphate, diethyl orthophosphate and hexaethyl tetraphosphate; amino compounds, such as triethylamine, ethylene diamine, diethylamine, diethylene triamine, triethylene tetramine, dicyandiamide, melamine; and salts of inorganic acids, such as zinc fluoborate, potassium persulfate, nickel fluoborate, copper fluoborate, selenium fluoborate, magnesium fluoborate, tin fluoborate, potassium magnesium arsenate, magnesium sulfate, cadmium arsenate, cadmium silicate, aluminum fluoborate, ferrous sulfate, ferrous silicate, manganese hydrophosphite, nickel phosphate and nickel chlorate.

The amount of the curing agents employed may vary over a considerable range depending upon the agent selected. With curing agents having replaceable hydrogen, such as the amine agents, amounts of agent employed vary up to and including equivalent proportions, i.e., sufficient curing agent to furnish a replaceable hydrogen atom for every epoxy group. In the case of acid anhydrides, amounts up to and including equivalent amounts or more are also used. In case of anhydrides, an equivalent amount refers to that amount needed to furnish one anhydride group per two epoxy groups. In most other cases, such as with metal salts, caustic materials, $BF_3$ complexes, phosphoric acid and esters, the agents may be employed in amounts varying from about 1% to 25% by weight of the material being cured. Other curing agents may be used in amounts varying from 1% to 40% by weight of material being cured.

The new epoxy ethers are particularly suited for use in making coating compositions as they can be cured at a fast rate to form very hard solvent and water resistant coatings. In this application, the epoxy ethers are dissolved in a suitable coating solvent along with the appropriate curing agent as an aliphatic or aromatic amine and any desired plasticizer, pigment and the like, and then the combined mixture applied to the desired surface, such as wood, metal, plastic, cement and the like. The cure of the coating may be accomplished at any desired temperature, but best results are generally obtained by heating at temperatures ranging from about 100° C. to 250° C.

The new epoxy ethers are also particularly useful in preparing high temperature adhesives, laminates or castings because of their good heat resistance. In these applications, the resins are preferably mixed with a suitable curing agent as described above, such as aromatic amine or acid anhydride, and any desired solvent or diluent and then applied to the mold or laminating sheets. Cure of the resin is preferably accomplished by application of temperatures ranging from about 100° C. to 200° C.

In using the new epoxy ethers in various applications, it is, in many cases, desirable to mix the resin with other materials, such as fillers, reactive diluents, pigments, and other resins such as phenolic resins, urea and melamine resins, polysulfide resins, polyvinyl resins and the like.

The epoxy ethers of the invention may also be further reacted with acids, and particularly drying oil acids, to form valuable materials for use in making coating compositions. Because of the aliphatic epoxy group in the phenol portion of the ethers, additional drying oil acids may be introduced per weight of the ether, and the product will thus have better drying properties.

To illustrate the manner in which the invention may be carried out, the following examples are given. It is to be understood, however, that the examples are for the purpose of illustration and the invention is not to be regarded as limited to any of the specific materials recited therein. Unless otherwise specified, parts disclosed in the examples are parts by weight.

*Example 1*

This example illustrates the preparation and some of the properties of a polyglycidyl ether of 1,2-epoxy-3,3-bis(4-hydroxyphenyl) propane.

1,2-epoxy-3,3-bis(hydroxyphenyl)propane is dissolved in 7:1 molar excess of epichlorohydrin and about 2.3% by weight of water is added. This solution is heated vigorously with stirring and the kettle temperature is adjusted to 100° C. at total reflux by adding additional water. After the kettle temperature has been adjusted, 2% molar excess of sodium hydroxide is added as a 46% by weight equivalent solution. A caustic solution is added over a 1.5 hour period. During this period, the kettle temperature is maintained at 100° C. by removing water periodically. The system is azeotroped to dryness after all the caustic solution has been added. The solution is filtered to remove salt formed during the reaction and the filtrate is distilled to remove the excess epichlorohydrin. This distillation is taken to a kettle temperature of 150° C. to 170° C. at 1-2 millimeters to insure complete removal of epichlorohydrin and other valuable products. The resulting product is a white soft wax-like solid having an epoxy value of 0.541 eq./100 g., hydroxy value of .168 eq./100 g., and chlorine value of 0.59%.

100 parts of the above-described glycidyl ether was mixed with 15 parts of meta-phenylene diamine and the mixture heated at 125° C. for several hours. The resulting product had a heat distortion point of 158° C. The Barcol hardness ratings of the casting after being maintained at various temperatures are shown in the table below:

| Temperature | RT | 60° C. | 80° C. | 100° C. | 120° C. | 140° C. | 150° C. |
|---|---|---|---|---|---|---|---|
| Barcol Hard | 55 | 48 | 46 | 42 | 37 | 33 | 29 |

The Barcol hardness values of a similar casting prepared from Epon 828 (glycidyl ether of 2,2-bis(4-hydroxyphenyl)propane are shown below:

| Temperature | RT | 60° C. | 80° C. | 100° C. | 120° C. | 140° C. | 150° C. |
|---|---|---|---|---|---|---|---|
| Barcol Hard | 40 | 25 | 23 | 14 | 6 | 0 | 0 |

After boiling in acetone for 3 hours, the casting had a Barcol hardness of 50 with a gain in weight of .43%. After being in boiling water for 3 hours, the casting had a Barcol hardness of 47 and had lost 1.0% in weight.

*Example II*

A glass cloth laminate was prepared using the polyglycidyl ether prepared as in Example I. An acetone solution containing 60% by weight of the polyglycidyl ether was prepared. A catalyst solution prepared by dissolving 13.5 parts of 2,6-diaminopyridine in 33.3 parts of water and 50 parts of acetone was added to the ether solution so that there was present an added 13.5 parts of the curing agent based upon the ether. A strip of 181 Volan A glass cloth was passed through the solution and dried for 10 minutes at about 90° C. The strip was cut in pieces and 6 plies were stacked together. The assembly was incased in cellophane and placed in a heated press having a temperature of about 175° C. The press platens were brought into contact pressure at about 3 p.s.i. for 1 minute and then the pressure was increased to 25 p.s.i. for 9 minutes. The product was a strong laminate having good heat resistance and water resistance.

*Example III*

The polyglycidyl ether of 1,2-epoxy-3,3-bis(hydroxyphenyl)-butane is prepared by the same procedure as outlined in Example I using as the phenol the polyhydric product obtained by reacting phenol with 1,2-epoxy-3-ketobutane. The resulting product is a light colored solid having an epoxy value of about .51 eq./100 g. This ether can be cured by heating with an equivalent amount of meta-phenylene diamine to form a hard solvent and water resistant casting.

A glass cloth laminate is prepared as described in Example II, with the exception that the polyglycidyl ether was replaced with the glycidyl ether of 1,2-epoxy-3,3-bis (hydroxyphenyl)butane prepared as shown above. The resulting laminate retains excellent hardness at elevated temperatures and has good water resistance.

*Example IV*

This example illustrates the preparation and some of the properties of a glycidyl ether of 1,2-epoxy-3,3-bis (hydroxyphenyl)-hexane (prepared from 1,2-epoxy-3-ketohexane and phenol).

The above-described polyhydric phenol is dissolved in a 14:1 molar excess of epichlorohydrin and about 2.3% by weight of water was added. The solution is heated vigorously with stirring and the kettle temperature is adjusted to 100° C. at total reflux by adding additional water. After the kettle temperature has been adjusted, 2% molar excess of sodium hydroxide based upon the polyhydric phenol is added as a 46% aqueous solution. The caustic solution is added over a 2 hour period. During this period, the kettle temperature is maintained at 100° C. by removing water periodically. The system is azeotroped to dryness as all the caustic solution has been added. The solution is filtered to remove salt from it during the reaction and the filter is distilled to remove the excess epichlorohydrin and other volatile products. The resulting product is a white solid.

100 parts of the above-described polyglycidyl ether is combined with 20 parts of 2.6 diaminopyridine and the mixture heated at 160° C. The resulting product is a hard, tough casting having good heat resistance and good resistance to acetone.

*Example V*

The polyglycidyl ether of 1,2-epoxy-4,4-bis(hydroxyphenyl)-pentane is prepared by the same procedure as outlined in Example I with the exception that the phenol reactant is replaced by 1,2-epoxy-4,4-bis(hydroxyphenyl)-pentane obtained by condensing phenol with 1,2-epoxy-4-ketopentane. The resulting product is a light colored solid which can be cured with an equivalent amount of tetrahydrophthalic acid anhydride to form a hard water and solvent resistant casting.

*Example VI*

Resins having related properties are obtained by replacing the polyhydric phenol in Example I with a polyhydric phenol obtained by condensing glycidaldehyde with resorcinol.

*Example VII*

Resins having related properties are obtained by replacing the polyhydric phenol in Example I with a polyhydric phenol obtained by condensing glycidaldehyde with ortho cresol.

*Example VIII*

Resins having related properties are obtained by replacing the polyhydric phenol in Example I with a polyhydric phenol obtained by condensing 1,2-epoxy-3-ketobutane with resorcinol.

*Example IX*

A series of experiments are accomplished wherein 100 parts of the resins shown in Examples I, IV, V and VI are combined with 100 parts of each of the following polyepoxides and with a chemical equivalent amount of meta-phenylene diamine curing agent and heating at 120° C.: diglycidyl ether of 2,2-bis(4-hydroxyphenyl)propane, diglycidyl ester of dimerized fatty acids, diglycidyl ester of isophthalic acid, expoxidized soybean oil, vinyl cyclohexene diepoxide and the polyglycidyl ether of 1,1,2,2-tetrakis(hydroxyphenyl)ethane. In each case, the resulting product was a hard, heat resistant casting.

*Example X*

About 100 parts of the glycidyl ether prepared as in Example I was dissolved in xylene and 70% of the equivalent amount of soybean oil fatty acid added thereto. The resulting mixture was heated under a blanket of nitrogen until the acid number had been reduced to about 10. The resulting xylene solution was then spread out on tin panels and allowed to air dry. The resulting coating is a hard flexible coating having good solvent resistance.

*Example XI*

A series of experiments are accomplished wherein 100 parts of the resins shown in Examples I, IV, V and VI are combined with a chemical equivalent amount of hexahydrophthalic anhydride and heating at 120° C. The resulting products are hard solvent resistant castings.

We claim as our invention:

1. A glycidyl polyether of 1,2-epoxy-3,3-bis(hydroxyaryl)alkane wherein the glycidyl radicals are attached to the oxygen atom of the OH group of the hydroxyaryl portion of the 1,2-epoxy-3,3-bis(hydroxyaryl)alkane molecule.

2. A glycidyl polyether of 1,2-epoxy-3,3-bis(4-hydroxyphenyl)propane wherein the glycidyl radicals are attached to the oxygen atom of the OH group of the 4-hydroxyphenyl portion of the 1,2-epoxy-3,3-bis(4-hydroxyphenyl)propane molecule.

3. A glycidyl polyether of 1,2-epoxy-3,3-bis(dihydroxyphenyl)propane wherein the glycidyl radicals are attached to the oxygen atom of the OH groups of the dihydroxyphenyl portion of the 1,2-epoxy-3,3-bis(dihydroxyphenyl)propane molecule.

4. A glycidyl polyether of 1,2-epoxy-3,3-bis(4-hydroxyphenyl)pentane wherein the glycidyl radicals are attached to the oxygen atom of the OH groups of the 4-hydroxyphenyl portion of the 1,2-epoxy-3,3-bis(4-hydroxyphenyl)pentane molecule.

5. Polyethers of (1) vic-epoxy alcohols of the group consisting of aliphatic and cycloaliphatic monohydric alcohols containing from 3 to 18 carbon atoms and having a single vic-epoxy group, and (2) polyhydric phenols of the formula

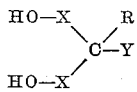

wherein R is a member of the group consisting of hydrogen, alkyl and cycloalkyl radicals containing up to 10 carbon atoms, X is residue of a monohydric phenol obtained by removing the phenolic OH and ring hydrogen and Y is a vic-epoxyalkyl radical containing up to 12 carbon atoms, the formation of the said polyethers taking place between the OH group of the vic-epoxy substituted alcohol defined in (1) and the phenolic OH groups on the phenol defined in (2).

6. A cured insoluble, infusible product obtained by heating the epoxy polyether of claim 5 with about a chemically equivalent amount of an epoxy curing agent of the group consisting of amines and carboxylic acid anhydrides.

7. A cured insoluble, infusible product obtained by heating the epoxy polyether of claim 5 with about a chemically equivalent amount of an amine curing agent.

8. A cured insoluble, infusible product obtained by heating a mixture of the epoxy polyether defined in claim 5 and a glycidyl polyether of 2,2-bis(4-hydroxyphenyl)propane with about a chemically equivalent amount of an amine curing agent.

9. A cured insoluble, infusible product obtained by heating the epoxy polyether of claim 5 with about a chemically equivalent amount of a carboxylic acid anhydride.

10. A cured product of glycidyl ether of 1,2-epoxy-3,3-bis(4-hydroxyphenyl)propane obtained by heating the glycidyl ether with about a chemical equivalent amount of a carboxylic acid anhydride.

11. A polyglycidyl ether of a polyhydric phenol of the formula

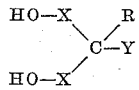

wherein X is residue of a monohydric phenol obtained by removing the phenolic OH and a ring hydrogen and Y is a vic-epoxyalkyl radical containing up to 12 carbon atoms, the formation of the glycidyl ether taking place at the phenolic OH groups shown in the above-noted formula.

12. A polyglycidyl ether of a polyhydric phenol of the formula

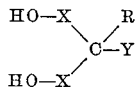

wherein R is an alkyl radical containing up to 10 carbon atoms, X is a residue of a monohydric phenol obtained by removing the phenolic OH and a ring hydrogen and Y is a vic-epoxyalkyl radical containing up to 12 carbon atoms, the formation of the said glycidyl ether taking place at the phenolic OH group shown in the structural formula.

References Cited in the file of this patent
UNITED STATES PATENTS

| | | |
|---|---|---|
| 1,539,517 | Schmidt | May 26, 1925 |
| 2,615,007 | Greenlee | Oct. 21, 1952 |
| 2,798,079 | Linn | July 2, 1957 |
| 2,806,016 | Schwarzer | Sept. 10, 1957 |
| 2,887,498 | Hearne et al. | May 19, 1959 |